United States Patent
Roos et al.

(10) Patent No.: US 12,536,741 B2
(45) Date of Patent: Jan. 27, 2026

(54) COMPUTER-IMPLEMENTED METHOD FOR CREATING A THREE-DIMENSIONAL VIRTUAL MODEL OF AN ENVIRONMENT OF A MOTOR VEHICLE

(71) Applicant: Dr. Ing. h.c. F. Porsche Aktiengesellschaft, Stuttgart (DE)

(72) Inventors: Stefan Roos, Kieselbronn (DE); Robin Schwager, Leonberg (DE); Tim Bruehl, Hoehr-Grenzhausen (DE); Lukas Ewecker, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 150 days.

(21) Appl. No.: 18/512,675

(22) Filed: Nov. 17, 2023

(65) Prior Publication Data
US 2024/0169668 A1 May 23, 2024

(30) Foreign Application Priority Data
Nov. 21, 2022 (DE) ...................... 10 2022 130 692.5

(51) Int. Cl.
*G06T 17/00* (2006.01)
(52) U.S. Cl.
CPC .................................... *G06T 17/00* (2013.01)
(58) Field of Classification Search
CPC ... G06T 2207/30252; G06T 7/11; G06T 7/70; G06T 2207/20021; G06T 17/00; G06T 2207/10028; G06T 7/73; G06T 2207/20081; G06V 20/58; G06V 20/80; G06F 18/24; G06F 18/253
See application file for complete search history.

(56) References Cited

U.S. PATENT DOCUMENTS

| | | | |
|---|---|---|---|
| 7,792,359 B2 | 9/2010 | Matsuda | |
| 11,145,112 B2 | 10/2021 | Milz | |
| 2019/0259194 A1* | 8/2019 | Ford | G06T 15/04 |
| 2022/0350995 A1* | 11/2022 | Bangalore Ramaiah | B60W 60/0025 |

OTHER PUBLICATIONS

Xiaoling Chen et al. "A Multidimensional Adaptive Entropy Cloud-Model-Based Evaluation Method for Grid-Related Actions" Energies 2022.

* cited by examiner

*Primary Examiner* — Hau H Nguyen
(74) *Attorney, Agent, or Firm* — LEYDIG, VOIT & MAYER, LTD.

(57) ABSTRACT

A computer-implemented method is provided for creating a three-dimensional virtual model of an environment (2) of a motor vehicle (1). The method includes capturing images of the environment (2); determining a plurality of regions (3; 4; 5; 6; 7; 8; 9) in each of the images and calculating a region entropy for each of the regions (3; 4; 5; 6; 7; 8; 9). The method then proceeds by selecting at least one region (4; 9) that has a higher region entropy than other regions (3; 5; 6; 7; 8); and generating the three-dimensional virtual model by first ascertaining three-dimensional coordinates for the selected at least one region (4; 9) and only thereafter ascertaining three-dimensional coordinates for the unselected regions (3; 5; 6; 7; 8). The three-dimensional virtual model includes the three-dimensional coordinates of all regions (3; 4; 5; 6; 7; 8; 9).

8 Claims, 1 Drawing Sheet

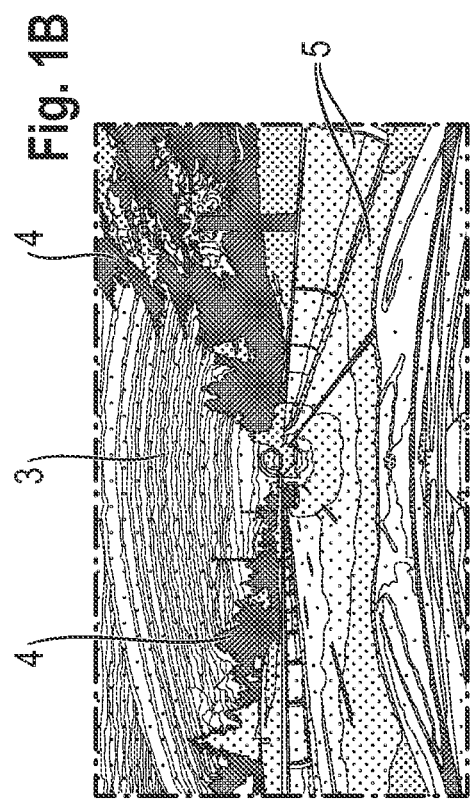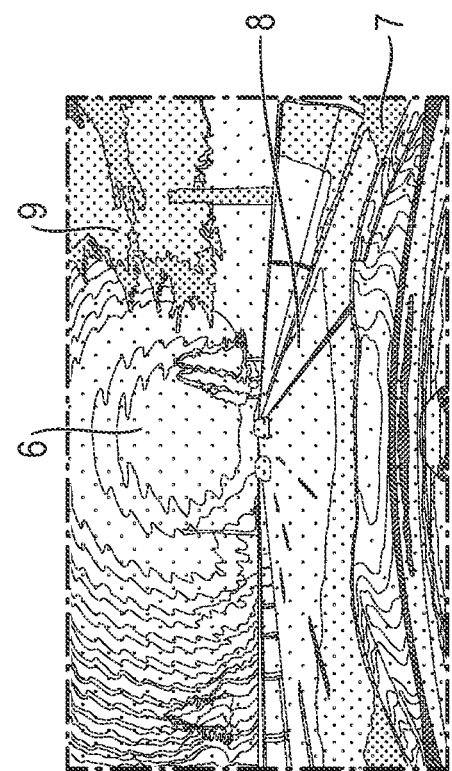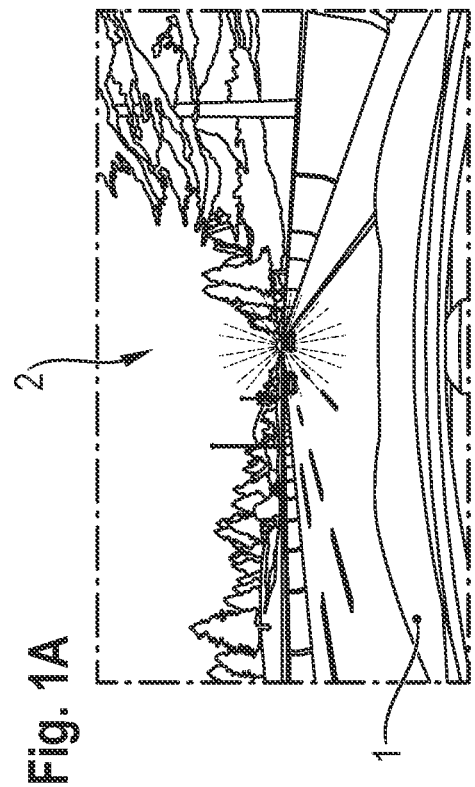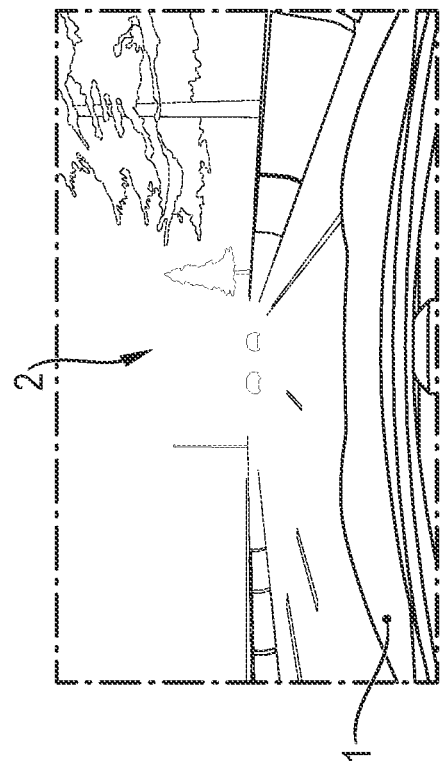

COMPUTER-IMPLEMENTED METHOD FOR CREATING A THREE-DIMENSIONAL VIRTUAL MODEL OF AN ENVIRONMENT OF A MOTOR VEHICLE

CROSS REFERENCE TO RELATED APPLICATION

This application claims priority on German Patent Application No 10 2022 130 692.5. filed Nov. 21, 2022, the entire disclosure of which is incorporated herein by reference.

BACKGROUND

Field of the Invention. The invention relates to a computer-implemented method for creating a three-dimensional virtual model of an environment of a motor vehicle.

Related Art. In the context of this description, a virtual model is understood to mean a model comprising data stored in a digital electronic memory. The three-dimensional virtual model may be used by a driver assistance system (DAS) or highly automated driving (HAD) functions to control the motor vehicle.

U.S. Pat. No. 11,508,120 discloses a method for creating a three-dimensional virtual model of an environment of a motor vehicle and describes a 3D scene generator to generate a 3D model for digital image scene reconstruction based on a trained generative model and a digital image captured in a real-world environment. An image simulator is used to generate a simulated image based on the 3D model, and the simulated image corresponds to the captured image. A discriminator is used to apply a discriminative model to the simulated image in order to determine whether the simulated image is simulated.

In contrast, the object of the invention is to create an improved method for creating such a model. In addition, a system for performing such a method and a motor vehicle comprising such a system are to be created.

SUMMARY OF THE INVENTION

According to the invention, images of the environment are captured, for example, by one or more cameras and/or acoustic sensors and/or a LIDAR system and/or an ultrasonic system and/or a radar system. The camera(s) or other systems can be arranged in or on the motor vehicle. The images can show different details of the environment, and the details can overlap with one another. For example, the images can be captured using the same camera(s) at different time points while the motor vehicle is moving.

Regions are determined in each of the images, and plural regions can be determined in each image. Regions can overlap and can also comprise comparatively few pixels. A region entropy is calculated in each case for each of the regions. In the context of this description, the region entropy is understood to mean a measure of the information content of the respective region. A high region entropy means that the region contains a lot of texture or structure and thus little redundancy. A low region entropy means that the region contains little randomness and thus high redundancy. The region entropy can be specified in bits, and the maximum region entropy can correspond to the sum of the memory space for all pixel values of the region. The entropy of a homogeneous region in which all pixels have the same color value can be zero. It is also possible to specify the region entropy as a dimensionless value between 0 and 1.

Thus, a well-lit region with one or more objects whose edge(s) have a high contrast to the respective environment can have a relatively high region entropy. However, a region that is poorly lit or reduced in contrast by precipitation or fog can have a relatively low region entropy.

At least one region that has a higher region entropy than other regions is selected from the regions, and a plurality of such regions can also be selected. The region(s) with the highest region entropy are selected. If plural regions are selected, they need not necessarily have the same region entropies.

The three-dimensional virtual model is generated by first ascertaining three-dimensional coordinates for the selected at least one region. Only thereafter are three-dimensional coordinates ascertained for the unselected regions. The three-dimensional virtual model comprises the three-dimensional coordinates of all regions. For example, the three-dimensional coordinates of all regions can depend on a distance of an object in this region from the motor vehicle. It is possible for plural three-dimensional coordinates to be ascertained for each region. For example, three-dimensional coordinates can be ascertained for each pixel in each region.

The selected regions are used as starting regions for ascertaining the three-dimensional coordinates. These regions have a higher region entropy than other regions and thus are particularly well suited as starting regions since the contours of the objects in these regions are particularly well delineated from their environment. These regions, therefore, are particularly well-suited for depth estimation since anchor points for a lot of texture or structure can be calculated.

According to one embodiment, the three-dimensional virtual model can comprise a point cloud. The point cloud can comprise a plurality of points. Each of the points can be determined by the three-dimensional coordinates.

According to one embodiment, each of the points can correspond to exactly one of the pixels.

In some embodiments, the three-dimensional coordinates can be calculated using a triangulation calculation or by an algorithm. For example, images of different cameras can be used in the triangulation calculation. The algorithm can use machine learning. For example, the algorithm can be part of an artificial intelligence.

The three-dimensional virtual model can be a model of the environment.

According to one embodiment, the three-dimensional virtual model can be used as input data for a driver assistance system (DAS) or a highly automated driving (HAD) function of a motor vehicle. In the context of this description, a driver assistance system is understood to mean an additional electronic or electromechanical device in the motor vehicle for supporting or supplementing the driver in particular driving situations. Here, the focus is often on safety aspects but also on increasing the driving comfort. A further aspect is improving economy. The driver assistance system (DAS) can, for example, comprise a brake assist and/or a lane assist based on the three-dimensional coordinates and/or distance of an object in this region from the motor vehicle as determined by the three-dimensional virtual model created by the method disclosed herein. It is also possible for the driver assistance system to autonomously control the motor vehicle and use the three-dimensional virtual model for this autonomous control. The driver assistance system (DAS) also can notify the driver of a refueling station or a battery recharging station ahead of the vehicle and can carry out a brake assist and/or a lane assist based on the three-dimensional coordinates and/or distance of an object in this region from the motor vehicle as determined by the three-dimensional virtual model created by the method disclosed herein.

The system of this disclosure can comprise a digital electronic memory and a processing unit. The processing unit can also be referred to as a processor, a control unit or a computer. The system can also comprise plural individual digital electronic memories and/or processing units. The digital electronic memory stores instructions that can be read and executed by the processing unit. The processing unit is designed to perform a method according to an embodiment of the invention when executing the instructions. In connection with the invention, a "processing unit" can be understood as meaning, for example, a machine or an electronic circuit or a powerful computer. A processor may be a main processor (Central Processing Unit, CPU), a microprocessor or a microcontroller, for example an application-specific integrated circuit or a digital signal processor, possibly in combination with a memory unit for storing program instructions, etc. A processor may also be understood as meaning a virtualized processor, a virtual machine or a soft CPU. It may also be a programmable processor equipped with configuration steps for carrying out the method disclosed herein or may be configured with configuration steps in such a manner that the programmable processor implements the features of the disclosed method, of the component, of the modules or of other aspects and/or partial aspects of the invention. Highly parallel computing units and powerful graphics modules also can be provided.

In connection with this disclosure, a "memory unit" or "memory module" and the like may be understood as meaning, for example, a volatile memory in the form of a random access memory (RAM) or a permanent memory such as a hard disk or a data storage medium or, for example, an interchangeable memory module. However, the memory module may also be a cloud-based memory solution.

In connection with this disclosure, a "module" can be understood as meaning, for example, a processor and/or a memory unit for storing program instructions. For example, the processor may specifically be configured to execute the program instructions such that the processor performs functions to implement or execute the method according to this disclosure or a step of the method.

The system can also comprise a camera that has a further digital electronic memory and a further processing unit. The camera may be a weatherproof action camera arranged in the outer region of the vehicle. Action cameras have wide-angle fisheye lenses, thus making it possible to achieve a visible radius of approximately 180°. Action cameras can usually record videos in full HD (1920×1080 pixels), but it is also possible to use action cameras in ultra HD or 4K (at least 3840×2160 pixels), thus resulting in a considerable increase in the image quality. The image recording frequency is usually 60 images per second in 4K and up to 240 images per second in full HD. In addition, an integrated image stabilizer may be provided. Action cameras often also are equipped with an integrated microphone. Differential signal processing methods can be used to hide background noises in a specific manner. The image and sensor data recorded by the camera and by any sensor device that may be provided preferably are forwarded to the processing unit via a wireless mobile radio connection.

The motor vehicle of the invention comprises a system according to one or more embodiments of the invention.

Further features and advantages of the invention become apparent from the following description of preferred exemplary embodiments, with reference to the appended figures.

The same reference signs are used for the same or similar features and for features having the same or similar functions.

BRIEF DESCRIPTION OF THE INVENTION

FIG. 1A is a schematic perspective view of an image captured by a camera of a motor vehicle in good visibility conditions.

FIG. 1B is a schematic representation of regions of the image of FIG. 1A with different region entropies.

FIG. 2A is a schematic perspective view of the image of FIG. 1A in poorer visibility conditions.

FIG. 2B is a schematic representation of regions of the image of FIG. 2A with different region entropies.

DETAILED DESCRIPTION

The image in FIG. 1A has been captured by a camera in the interior of the motor vehicle 1 and shows an environment 2 of the motor vehicle 1 in relatively good visibility conditions. For example, FIG. 1A can be an image captured in daylight without precipitation or fog.

FIG. 1B shows different regions 3, 4 and 5 with different region entropies. The region 3 comprises the sky without clouds and thus has a particularly low region entropy since it is a contourless surface with little color changes. The regions 5 comprise the roadway or a roadway boundary. They likewise have predominantly few color changes but have contours. They thus have a higher region entropy than the region 3. The regions 4 each comprise a tree and have the highest region entropy since the tree in each case has many different color shades and a great many sharply delineated contours. This is in particular true for the outer well-lit regions of the tree.

For the creation of a three-dimensional virtual model of the environment 2, at least the regions 4 are selected since they have the highest region entropy. Optionally, the regions 5 also can be selected. The three-dimensional virtual model is now generated by first ascertaining three-dimensional coordinates for the selected regions. This can take place with an algorithm or by a triangulation calculation using further images. The selected regions are particularly well suited for this purpose since contours of depicted objects, e.g., the trees in the regions 4, can be ascertained well for the triangulation calculation or the algorithm. Three-dimensional coordinates for regions with lower region entropy, such as the region 3, can be ascertained thereafter. They are of lesser importance for the three-dimensional virtual model since they are further away from the motor vehicle 1 and, in some circumstances, do not contain any recognizable objects, as in the case of the sky in the region 3.

Particularly advantageous is the use of a method according to one embodiment of the invention in poorer visibility conditions, as shown in FIG. 2A. All regions 6, 7, 8 and 9 in FIG. 2B have a lower region entropy than the corresponding regions in FIG. 2A. This is caused by the lower contrasts due to the poorer visibility conditions. For example, the poorer visibility conditions can be caused by precipitation or fog.

A very large region 6 has a particularly low region entropy. For example, it can be a low-contour region that predominantly consists of barely differing shades of gray for the driver, as it occurs in fog, for example. This region 6 is hardly or not at all suited for the creation of the three-dimensional virtual model. The roadway in the region 8 also has a lower region entropy than in better visibility conditions in FIG. 1B. The region 7 that is arranged closer to the motor vehicle than the region 8 likewise comprises a part of the roadway. However, due to the smaller distance from the motor vehicle 1, more contours can be recognized so that the region entropy is somewhat higher in the region 7 than in the region 8. The region 9 in FIG. 2 comprises a tree at a relatively small distance from the motor vehicle 1 and has the highest region entropy.

For the creation of a three-dimensional virtual model of the environment 2 of FIG. 2A, at least the region 9 is selected since it has the highest region entropy. Optionally, the region 7 could also be selected. The three-dimensional virtual model now is generated by first ascertaining three-dimensional coordinates for the selected regions. This can take place with an algorithm or by a triangulation calculation using further images. The selected regions are particularly well suited for this purpose since contours of depicted objects, e.g., of the tree in the region 9, can be ascertained well for the triangulation calculation or the algorithm.

Particularly in comparatively poor visibility conditions, it is advantageous to first ascertain the three-dimensional coordinates in the regions with relatively high region entropy since the entropy of the entire image is comparatively low so that a random selection of a region would likely be poorly suited for ascertaining the three-dimensional coordinates. In the region 6, which may, for example, predominantly consist of fog, the three-dimensional coordinates can be ascertained only very inaccurately in some circumstances. On the other hand, if the three-dimensional coordinates in the regions 7, 8 and 9 have already been ascertained beforehand, a comparatively large number of three-dimensional coordinates already exist so that the three-dimensional coordinates in the remaining regions can be ascertained more precisely.

The invention claimed is:

1. A computer-implemented method for creating a three-dimensional virtual model of an environment (2) of a motor vehicle (1), the method comprising:

using at least one camera on the motor vehicle for capturing images of the environment (2);

determining regions (3; 4; 5; 6; 7; 8; 9) in each of the images;

calculating a region entropy for each of the regions (3; 4; 5; 6; 7; 8; 9); and thereafter selecting at least one region (4; 9) that has a higher region entropy than other regions (3; 5; 6; 7; 8);

ascertaining three-dimensional coordinates for the selected at least one region (4; 9) that has the higher region entropy than the other regions (3; 5; 6; 7; 8) and only thereafter;

using the three-dimensional coordinates ascertained for the selected at least one region (4, 9) as anchor points in a triangular calculation for ascertaining three-dimensional coordinates for the unselected regions (3; 5; 6; 7; 8); and generating the three-dimensional virtual model based on the three-dimensional coordinates of all of the regions (3; 4; 5; 6; 7; 8; 9).

2. The method of claim 1, wherein the three-dimensional virtual model comprises a point cloud that comprises a plurality of points.

3. The method of claim 2, wherein each of the points in the point cloud is determined by the three-dimensional coordinates.

4. The method of claim 1, wherein the three-dimensional coordinates are calculated using an algorithm that uses machine learning.

5. The method of claim 1, wherein the three-dimensional virtual model is a model of the environment (2).

6. The method of claim 1, wherein the three-dimensional model is used as input data for a driver assistance system of the motor vehicle (1).

7. A system comprising a digital electronic memory and a processing unit, wherein instructions that can be read and executed by the processing unit are stored in the digital electronic memory, wherein the processing unit is designed to perform the method of claim 1 when executing the instructions.

8. A motor vehicle (1) comprising the system of claim 7.

* * * * *